(No Model.)
M. L. RANSOM.
DRAFT EQUALIZER.
No. 507,559.  Patented Oct. 31, 1893.
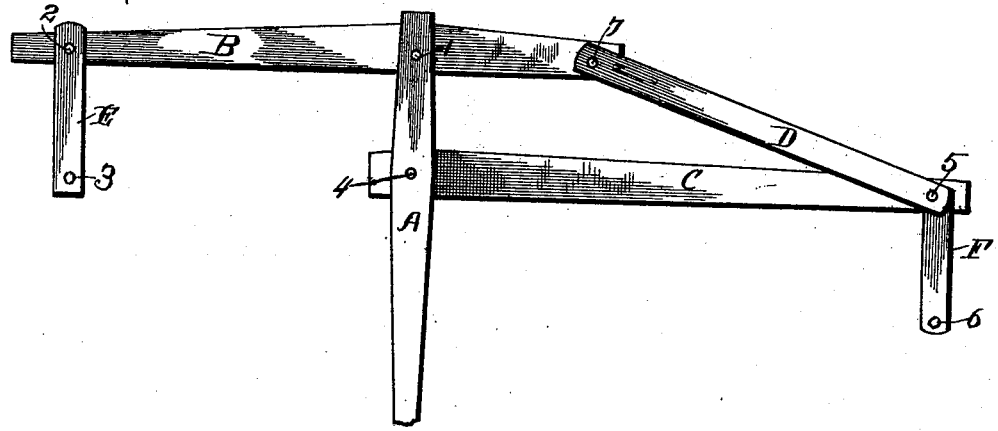
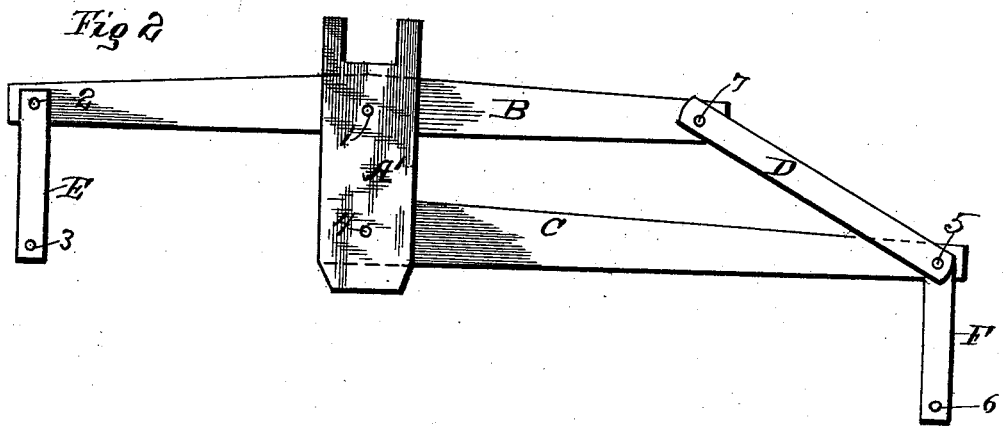
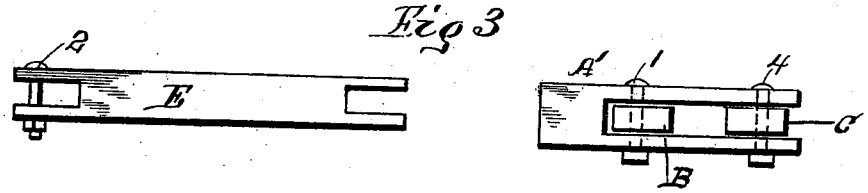
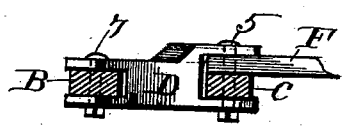
Witnesses
C. C. Burdine
H. E. Peaks
Inventor
Merritt Leroy Ransom
per
J. G. Manahan
atty.

UNITED STATES PATENT OFFICE.

MERRITT LEROY RANSOM, OF DIXON, ILLINOIS.

DRAFT-EQUALIZER.

SPECIFICATION forming part of Letters Patent No. 507,559, dated October 31, 1893.

Application filed August 6, 1890. Serial No. 361,236. (No model.)

*To all whom it may concern:*

Be it known that I, MERRITT LEROY RANSOM, a citizen of the United States, residing at Dixon, in the county of Lee and State of Illinois, have invented certain new and useful Improvements in Draft-Equalizers and Spacers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in draft equalizers intended for use with three or more horses, and the objects of my improvements are, first, to so space the relative position of the three horses that they may be attached to an implement or vehicle having a tongue, at a proper and convenient distance from said tongue; second, to afford facilities in the use of four horses abreast, to move the point of draft attachment any desired distance either way from a locality mid-way between the teams. I attain these objects by the mechanism illustrated in the accompanying drawings, in which—

Figure 1. represents my invention when employed to attach three horses to a vehicle, or implement, having a tongue. Fig. 2. illustrates my invention as employed for attaching four horses abreast to a plow or other implement—the draft attachment on the whiffle-trees being at the center of the latter, but located slightly at one side of a point mid-way between the teams. Fig. 3. are details of parts shown in Fig. 2.

Referring to Fig. 1. A. indicates one form of draft bar or attaching device, as the usual tongue which is suitably attached at its rear end to an implement or vehicle and carried at its front end in a neck yoke attached to the inner horse of the double team and to the single horse.

B. is a draft equalizer bar pivotally attached under the tongue A. at 1. The single horse is attached to the longer end of the bar B. at the point 2. by means of an arm E. which is pivoted in a horizontal plane near its rear end at 2. on the longer end of the bar B. and extends forward a sufficient distance to bring the horse attached thereto in any suitable mode at 3. substantially abreast of the other two horses.

The difficulty heretofore met with in attaching three horses to a tongue has been that the inner horse of the double team is brought inconveniently close to the tongue by reason of the double team being attached to the short end of the bar B. To obviate this, and to afford the necessary room between the double team and tongue, I employ a spacing arm C. the inner end of which is pivoted under the tongue A. at the point 4. forward of the pivotal seat of the bar B. The arm C. is projected a suitable distance beyond the short end of the bar B. and a short arm F. pivoted in a horizontal plane at its rear end to the spacer C. at 5. near the outer end of the latter. The whiffle-tree of the double team is attached in any suitable mode to the front end of arm F. at the point 6. on the latter. The draft of the double team is communicated to the short end of the bar B. by means of the diagonal arm D. pivoted at its outer end at 5. on the spacer C. and pivoted at its inner end at the point 7. on the bar B. As the distance between 7. and 1. is one half of that between 1. and 2, the draft required of the double team on the bar B. is just double that required of the single horse. The action of the double team is to all intents and purposes the same as though it were exercised in a direct line forward of the point 7. yet the spacer or spacing arm C. holds the whiffle-tree attachment of the double team thereto, a sufficient distance from the tongue A. to give the inside horse of the double team sufficient room between his mate and the tongue. The pivotal connections at 4. and 5. of the spacer C. permit the latter to oscillate forward and back to accommodate itself to the movements of the bar B.

The draft arms E. and F. may be provided with horizontal slots at their rear ends, and have clevis like connection with the parts B. and C. respectively, or such draft arms may consist of an upper and lower plate.

The construction shown in Fig. 1. is more particularly advantageous in the use of disk harrows in which there is always employed a tongue, and the draft of which is such as to require the employment of three horses.

Referring to Fig. 2, the bar B is pivoted at its center 1. to another form of attaching device as a clevis A'. the latter having a flexible connection at its rear end, to the plow beam. The construction shown in this figure is a mode of attaching four horses to a plow. In plowing it is desirable that none of the horses walk on the plowed ground, and that the horse nearest the plowed ground walks in the last previous furrow. This situation of the four horses throws the point which is midway between the two teams too far into the land, or from the plowed ground. For the ordinary four horse plows, it is desirable that the point of attachment of the plow beam to the equalizer bar, shall be about eight inches toward the plowed ground from the center of such general whiffle-tree, to give the plow the right width of gash or furrow.

The arm E. is pivotally attached at its rear end to the bar B. at 2. and is adapted at its front end 3. to receive the ordinary whiffle-tree of the team next the plowed ground, the outer horse of which walks in the last previous furrow. The other team is attached at 6. to the front end of the short arm F. the rear end of the latter being pivotally connected at 5. to the outer end of the spacing arm C. A diagonal arm D. pivotally attached at its outer end to the arm C. at 5. and at its inner end to the bar B. at 7. affords means of attaching the adjacent team to the bar B. the same distance from the pivotal center of the latter that the other team is attached. But it will be observed that the point 5. which is directly in the rear of the center of the double-tree of the adjacent team, is some distance farther from the clevis A'. than the point 3. which is directly in the rear of the center of the double-tree of the team attached thereto. The arm C. has a pivotal attachment 4. to the clevis A'. and oscillates thereon, forward and back to accord with the oscillations of the bar B. While the two teams draw evenly upon the bar B. the spacer C. permits the clevis A'. and therefore the plow, to be attached to bar B. one side of the center line between the teams. The spaces from 1. to 2. and from 1. to 7. on the evener B. are twenty-two inches. The distance from point 4. on clevis A'. to point 5. on spacer C. is thirty inches. This brings the front end of the beam of the plow eight inches nearer the plowed ground than would be the center line between the teams, and ordinarily this is the right adjustment, but by the use of graduated clevises on the plow beam, this adjustment can be varied, or with plows of greater or less width of cut, the length of all the parts shown may be varied, or the point of attachment thereon be changed as may be desired.

In Fig. 1. the spacer C. and brace arm D. are employed to properly locate the horses in reference to the tongue A. In Fig. 2. the same devices are utilized to properly locate the clevis A'. with reference to the horses, and in both constructions the functions of the spacer C. and diagonal arm D. are to locate the positions of the teams attached to each end of the bar B. in reference to the point of ultimate draft or attachment, the latter being the tongue A. in the one construction, and clevis A'. in the other.

The whiffletree B. will operate equally well on the upper side of the tongue A. The construction shown avoids side draft. In Fig. 1. the distance from "1" to "2" is eighteen inches; from "1" to "7" is nine inches, and from "4" to "5" is twenty-seven inches, all measurements being from center to center.

What I claim as my invention, and desire to secure by Letters Patent of the United States, is—

1. In a draft equalizer, the combination, with a draft bar, of a draft equalizer bar B pivotally secured thereto, a spacer arm C pivotally secured at its inner end to the draft bar at a point in front of and in a line with the pivotal point of the bar B and having its outer end extending beyond the outer end of the bar, and an arm D extending diagonally from the outer end of the bar B to the outer end of the arm C, said bar B and arm C being provided with means for attaching the team thereto, substantially as set forth.

2. In a draft equalizer, the combination, with a draft bar provided with arms, of an equalizer bar B pivotally secured between said arms near their rear ends, a spacing arm C pivotally secured at its inner end between said arms at a point in front of and in a line with the pivotal point of the bar B, a diagonal arm D pivotally secured at its rear end to one end of the bar B and having its front end enlarged and bifurcated and pivotally connected with the outer end of the spacing arm C, an arm F pivotally secured to the arms C and D, the arms C and F being secured within the bifurcation of the arm D, and an arm E pivotally secured to the opposite end of the bar B, substantially as set forth.

In testimony whereof I affix my signature in presence of two witnesses.

MERRITT LEROY RANSOM.

Witnesses:
JOHN G. MANAHAN,
ADDA E. WARD.